United States Patent
Oyama

(10) Patent No.: US 7,522,196 B2
(45) Date of Patent: Apr. 21, 2009

(54) IMAGE SENSING APPARATUS AND CONTROL METHOD THEREOF

(75) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

(21) Appl. No.: 11/335,143

(22) Filed: Jan. 19, 2006

(65) Prior Publication Data
US 2006/0164535 A1 Jul. 27, 2006

(30) Foreign Application Priority Data
Jan. 24, 2005 (JP) ............... 2005-015846

(51) Int. Cl.
H04N 5/225 (2006.01)
H04N 5/76 (2006.01)
H04N 5/222 (2006.01)

(52) U.S. Cl. .................. 348/231.99; 348/333.02; 348/220.1

(58) Field of Classification Search .......... 348/220.1, 348/231.99, 231.2, 333.02
See application file for complete search history.

(56) References Cited
U.S. PATENT DOCUMENTS
7,339,620 B1 * 3/2008 Yamagishi et al. .......... 348/243
2003/0193578 A1 * 10/2003 Parulski et al. ........... 348/220.1
2005/0140800 A1 * 6/2005 Jeon et al. ............. 348/231.99
2005/0253934 A1 * 11/2005 Yamagishi et al. ....... 348/222.1

FOREIGN PATENT DOCUMENTS

| JP | 10-276400 | 10/1998 |
|---|---|---|
| JP | 2001-346085 | 12/2001 |
| JP | A2003-087608 | 3/2003 |
| JP | 2003-224806 | 8/2003 |
| KR | 1999-0039169 | 6/1999 |
| KR | 2003-0041407 | 5/2003 |

* cited by examiner

Primary Examiner—James M Hannett
(74) Attorney, Agent, or Firm—Cowan, Liebowitz & Latman, P.C.

(57) ABSTRACT

When image shooting is performed in a mode that records plural images in response to a single shooting instruction and deletion is instructed on a shot-image confirmation screen that displays the shot image data immediately after the shooting, the plural image data generated by the same shooting instruction are all collectively deleted. On the contrary, in a playback mode, when deletion is instructed to one of the plural image data shot by the same shooting instruction, only the one image that has been instructed for deletion is deleted. This feature improves usability of the image sensing apparatus capable of recording plural images in response to a single shooting instruction.

9 Claims, 7 Drawing Sheets

FIG. 7
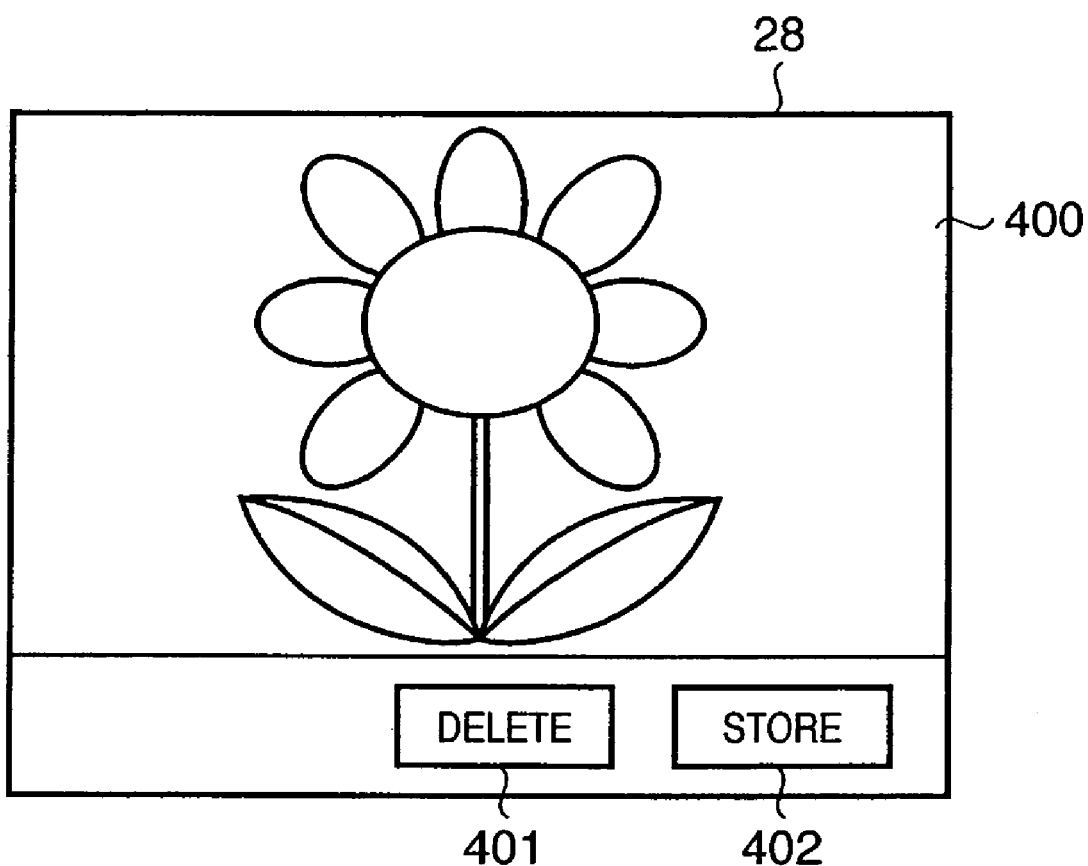
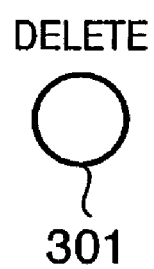

IMAGE SENSING APPARATUS AND CONTROL METHOD THEREOF

FIELD OF THE INVENTION

The present invention relates to an image sensing apparatus, and more particularly, to an image managing method of an image sensing apparatus which is capable of plural image recording in response to a single shooting instruction.

BACKGROUND OF THE INVENTION

Recent years have seen advancement in intelligent features of image sensing apparatuses utilizing image sensing devices, e.g., digital still cameras, digital video cameras, and so on. Since these image sensing apparatuses process images as digital data, shot images can be recorded with various effects.

Some of these image sensing apparatuses comprise the function for generating and recording plural image files in response to a single shooting operation, e.g., a bracket function where plural images are photographed while slightly changing an exposure or a white balance in a single shooting operation.

In a conventional image sensing apparatus, plural image data files that are generated and recorded in a single shooting operation utilizing the bracket function are managed in the same manner as other image data files that are generated and recorded in a normal shooting operation.

Usually plural images generated in a single shooting operation are related. For instance, plural images photographed by the bracket function basically have exactly or substantially the same angle of view, although they may have different tints. Therefore, in some cases it is convenient to manage these plural images collectively.

However, in a conventional image sensing apparatus, for instance, in a case where a user wishes to delete all the three bracketed shots, it is necessary to switch the apparatus to, e.g., a playback mode, and individually select and delete the three images, as similar to the case of deleting three normally shot images, thus is inconvenient to the user.

SUMMARY OF THE INVENTION

The present invention has been proposed in view of the above-described problem of the conventional art, and has as its object to provide a user-friendly image sensing apparatus and control method thereof which can improve management of plural images that have been shot in a single shooting instruction.

According to an aspect of the present invention, there is provided an image sensing apparatus having a single-image shooting mode for generating single image data in response to a single shooting instruction, and a plural-image shooting mode for generating plural image data in response to a single shooting instruction, comprising: a display control unit adapted to display shot image data immediately after shooting; a detection unit adapted to detect existence or absence of a delete instruction during displaying of the shot image data; and a deletion unit adapted to delete, upon detection of a delete instruction, only the shot image data being displayed if the shot image data being displayed is generated by shooting in the single-image shooting mode, and deletes the shot image data being displayed as well as other image data generated by shooting in the plural-image shooting mode if the shot image data being displayed is generated by shooting in the plural-image shooting mode.

According to an aspect of the present invention, there is provided a control method of an image sensing apparatus having a single-image shooting mode for generating single image data in response to a single shooting instruction, and a plural-image shooting mode for generating plural image data in response to a single shooting instruction, comprising: a display step of displaying shot image data immediately after shooting; a detection step of detecting existence or absence of a delete instruction during displaying of the shot image data; and a deletion step of deleting, upon detection of a delete instruction, only the shot image data being displayed if the shot image data being displayed is generated by shooting in the single-image shooting mode, and deleting the shot image data being displayed as well as other image data generated by shooting in the plural-image shooting mode if the shot image data being displayed is generated by shooting in the plural-image shooting mode.

According to the image sensing apparatus of the present invention, in a case where a user instructs deletion on a shot-image confirmation screen immediately after a shooting instruction with respect to plural images generated in response to a single shooting instruction, all the plural images recorded in the shooting operation are collectively deleted. By virtue of this feature, when a user wishes to cancel the shooting, e.g., a case where the result is different from what the user has expected, the user only needs to give a delete instruction on the shot-image confirmation screen to collectively delete all the plural images recorded in the shooting operation. It is no longer necessary to switch the apparatus to the playback mode and delete plural images one by one, as it was conventionally necessary.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing a shot-image confirmation screen displayed on the image sensing apparatus according to the embodiment of the present invention.

DETAILED DESCRIPTION OF THE PREFERRED EMBODIMENTS

Preferred embodiments of the present invention will now be described in detail in accordance with the accompanying drawings.

The following embodiments provide descriptions on an example applying the present invention to a digital still camera which serves as an example of an image sensing apparatus. However, the present invention is not limited to a digital still camera, but is applicable to an arbitrary image sensing apparatus (e.g., a digital video camera and a digital still camera) which records images as electric signals or digital data. Furthermore, the present invention is also applicable to an arbitrary apparatus which can incorporate or utilize such image sensing apparatus, for instance, a data processing apparatus having an image sensing function (e.g., a personal computer) or a portable terminal having an image sensing function (e.g., a mobile telephone).

<Description on Configuration>

Figure 1:
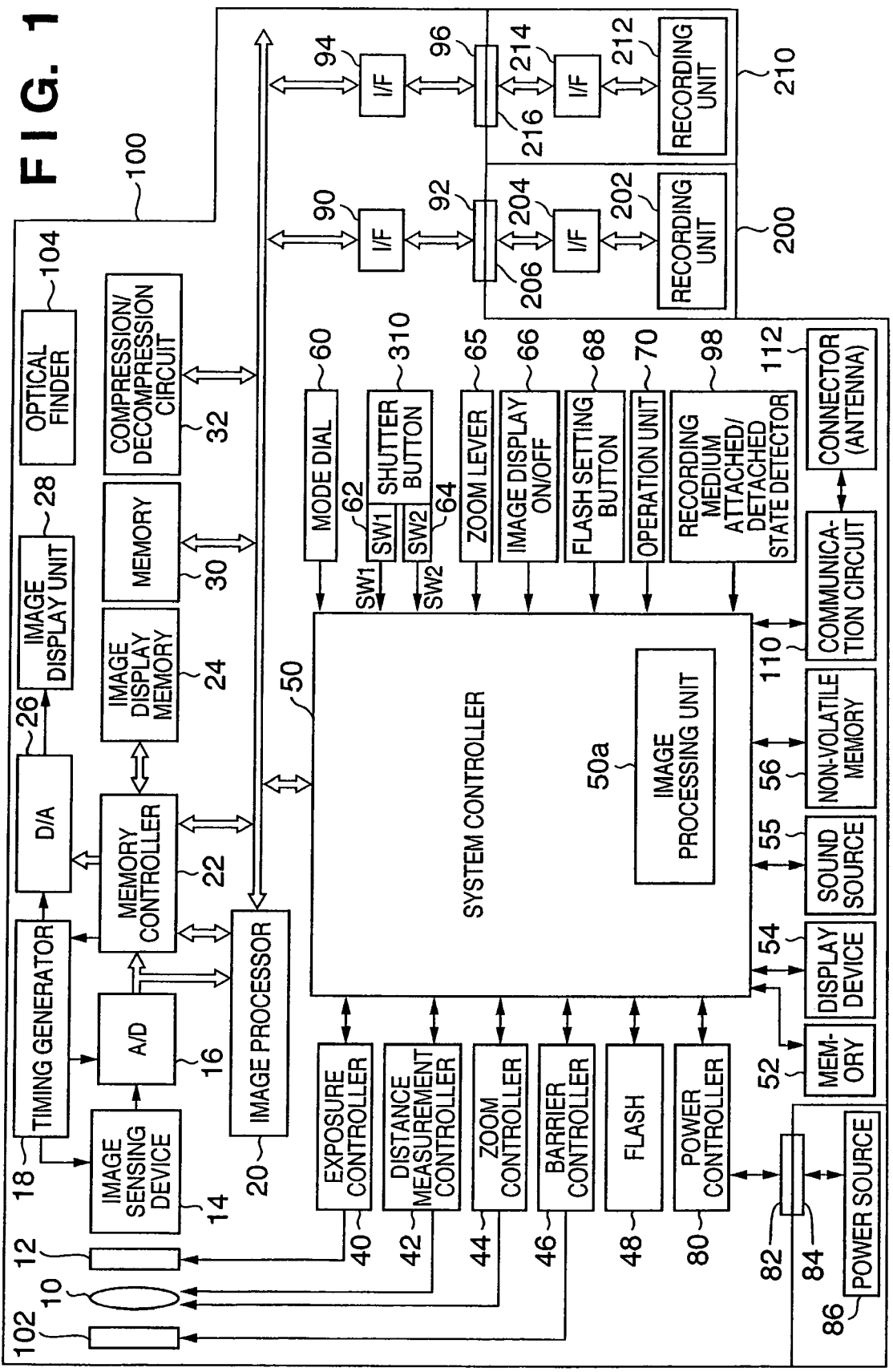
FIG. 1 is a block diagram showing an example of a construction of a digital camera, serving as an image sensing apparatus according to an embodiment of the present invention.

FIG. 1 is a block diagram showing an example of a construction of a digital still camera (hereinafter simply referred to as a digital camera) according to an embodiment of the present invention.

A digital camera 100 is configured to shoot an object image through an optical system (image sensing lens) 10. The optical system 10 may be of a zoom lens, thereby providing an optical zoom function. The digital camera 100 may further include an electronic zoom function, where an image sensed by an image sensing device 14 is enlarged by image processing. Note that in some cases the digital camera 100 comprises only one of the optical zoom function or the electronic zoom function. Furthermore, as seen in a single lens reflex camera, the optical system 10 may be exchangeable.

The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object that goes through the optical system (image sensing lens) 10 passes through an opening of a shutter 12 having a diaphragm function, and forms an optical image of the object on the image sensing surface of the image sensing device 14 (e.g., a CCD sensor or a CMOS sensor). The image sensing device 14 converts the optical image to analog image signals and outputs the signals to an A/D converter 16. The A/D converter 16 converts the analog image signals to digital image signals (image data). The image sensing device 14 and the A/D converter 16 are controlled by clock signals and control signals provided by a timing generator 18. The timing generator 18 is controlled by a memory controller 22 and a system controller 50.

An image processor 20 performs image processing, such as pixel interpolation and color conversion, on the image data supplied from the A/D converter 16 or the image data supplied from the memory controller 22. Moreover, the image processor 20 performs various calculations based on the sensed image data, and supplies the calculated results to the system controller 50. The data obtained by these calculations are used in through-the-lens (TTL) auto focus (AF) processing, auto exposure (AE) processing, and EF (automatic light control using pre-flash) processing. The system controller 50 controls an exposure controller 40 and a distance measurement controller (AF controller) 42 based on the calculation results, thereby realizing the automatic exposure and automatic focusing functions. Furthermore, the image processor 20 also executes TTL auto white balance (AWB) processing based on the sensed image data.

The memory controller 22 controls the A/D converter 16, the timing generator 18, the image processor 20, an image display memory 24, a D/A converter 26, a memory 30, and a compression/decompression circuit 32.

The image data outputted by the A/D converter 16 is written in the image display memory 24 or the memory 30 through the image processor 20 and the memory controller 22, or only through the memory controller 22. Note, before writing the image data in the image display memory 24, the image data is appropriately thinned out in accordance with the resolution of the display comprised in the image display unit 28. The image data written in the image display memory 24 is converted to analog signals by the D/A converter 26, and displayed by the image display unit 28. The display of the image display unit 28 is configured with a TFT, an LCD or the like.

By sequentially displaying sensed images on the image display unit 28, an electronic view finder (EVF) function is realized. The display of the image display unit 28 can arbitrarily be turned on or off in accordance with a command from the system controller 50. Turning off the display can largely reduce the power consumption of the digital camera 100.

The memory 30 is used for storing still images or moving images that have been shot. The memory 30 has a sufficient storage capacity and read/write speed for storing a predetermined number of still images or predetermined time of moving images. By virtue of this, high-speed large-amount image data writing can be performed in the memory 30 in a case of panoramic shooting or serial shooting where plural still images are serially shot. Furthermore, the memory 30 can also be used as a working area of the system controller 50.

The compression/decompression circuit 32 compresses or decompresses image data by, e.g., adaptive discrete cosine transformation (ADCT). The compression/decompression circuit 32 may be configured to perform compression or decompression processing on the image data read out of the memory 30 and write the processed image data in the memory 30.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A barrier controller 46 controls the operation of a barrier 102 to protect the optical system 10.

The system controller 50, such as a CPU, controls the overall digital camera 100 by executing a program stored in a memory 52. The system controller 50 includes an image processing unit 50a which executes processing for rendering an object (object to be displayed), indicative of image sensing parameters and/or the state of image sensing apparatus, displayed on the image display unit 28.

The memory 52 stores constants, variables, and programs for operation of the system controller 50, as well as object data for displaying an object on the image display unit 28.

Object data may typically be written in the memory 52 before shipment of the digital camera 100. After shipment of the digital camera 100, the object data may be rewritten by a user based on data downloaded through a telecommunication line or data provided to a user in a recording medium. The object data may also be rewritten at the service center or the like.

A display device 54, e.g., an LCD or an LED, and a sound source 55, e.g., a speaker, output operating statuses, messages and the like by using texts, images, sound and the like in correspondence with execution of a program in the system controller 50. One or plural display devices 54 are provided at an easily recognizable positions near, e.g., an operation unit 70. Part of the display device 54 is provided within the optical finder 104.

Information displayed on the display device 54 includes, e.g., indication of single shot/serial shot, a self-timer, a compression rate, the number of recorded pixels, the number of recorded images, the number of recordable images, a shutter speed, an f-stop value, and exposure compensation. Besides, the information may include indication of flash emission, red-eye reduction, macro image sensing, a buzzer-set state, a timer battery level, a battery level, an error state, information using plural digit numbers, and the attached/detached status of recording media 200 and 210. Furthermore, the information may include indication of communication I/F operation, date and time, the connection status with external computers, a focus state, a camera-ready status, a camera shake warning, a flash charge state, and a recording medium operating state. Part or all of the above information may be displayed within the optical finder 104.

A non-volatile memory 56 is an electrically erasable and recordable memory such as an EEPROM. The aforementioned object data may be stored in the non-volatile memory 56.

A mode dial 60, shutter switches 62 and 64, an image display ON/OFF switch 66, a flash setting button 68, and an operation unit 70 constitute an operation part for inputting various operation instructions to the system controller 50. The operation part is realized by a single or plural combinations of buttons, switches, dials, touch panels, pointing devices using line-of-sight detection, voice recognition devices, and the like.

Hereinafter concrete descriptions of the operation part are provided.

The mode dial 60 is a switch for selecting various function modes such as a power OFF mode, an automatic shooting mode, a shooting mode, a panoramic shooting mode, a reproduction mode, a multi-image reproduction/deletion mode, and a PC connection mode.

The first shutter switch (SW1) 62 is turned ON by halfway operation (half-stroke) of a shutter button 310. This instructs the system controller 50 to start the operations of AF processing, AE processing, AWB processing, EF processing or the like.

The second shutter switch (SW2) 64 is turned ON by complete operation (full-stroke) of the shutter button 310. As a result, the system controller 50 starts a series of processing (shooting) including the following: processing to read image signals from the image sensing device 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensing device 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 204 and 214 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

Figure 2:
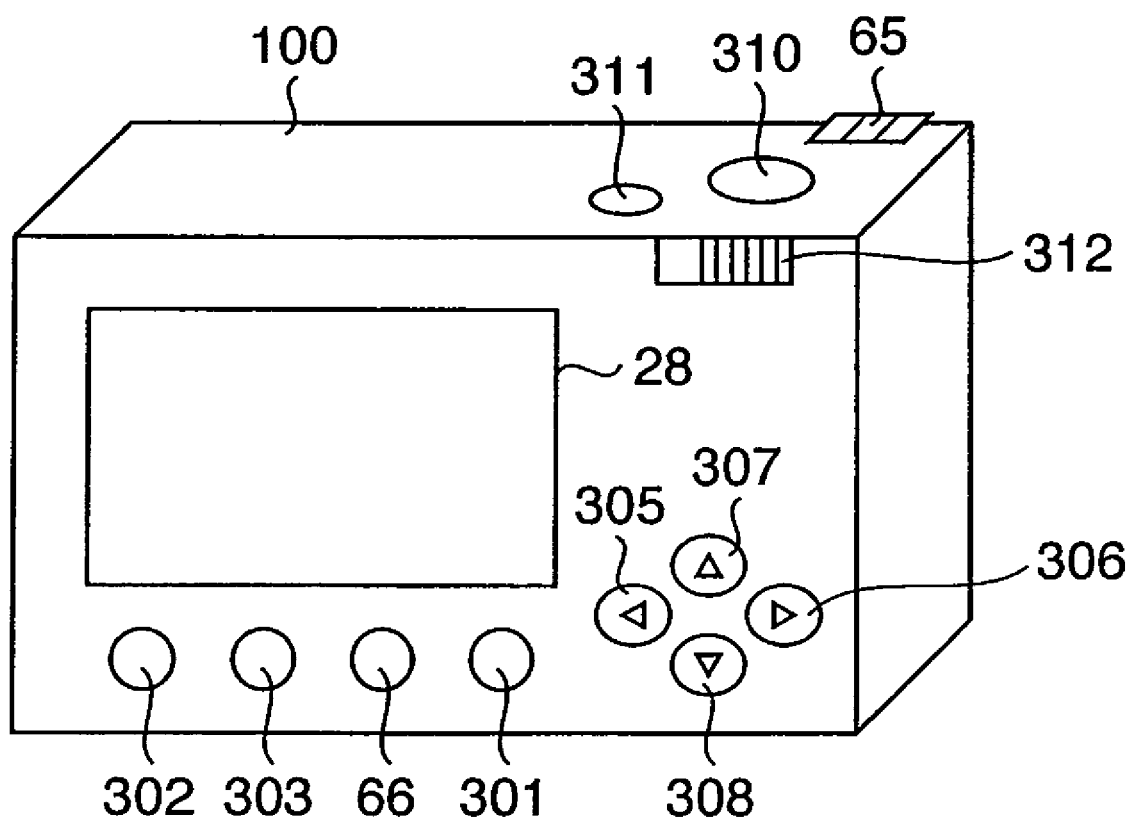
FIG. 2 is a perspective view showing an example of an external appearance of the image sensing apparatus according to the embodiment of the present invention.

FIG. 2 is a perspective view showing an example of an external appearance of the digital camera 100. Note in FIG. 2, unnecessary components are omitted for description purpose. The aforementioned operation unit 70 comprises, e.g., buttons and switches 301 to 311 shown in FIG. 2. A user operates these buttons and switches 301 to 311 for turning ON/OFF the power of the digital camera 100, for setting, changing or confirming the shooting parameters, for confirming the status of the camera, and for confirming shot images.

The power button 311 is provided to start or stop the digital camera 100, or to turn ON/OFF the main power of the digital camera 100. The menu button 302 is provided to display the setting menu such as shooting parameters and operation modes of the digital camera 100, and to display the status of the digital camera 100. The menu has, e.g., a hierarchical structure, and each hierarchy includes selectable items or items whose values are variable.

A delete button 301 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 303 is pressed for selecting a mode or an item. When the enter button 303 is pressed, the system controller 50 sets the mode or item selected at this time. The display ON/OFF button 66 is used for selecting displaying or non-displaying of photograph information regarding the shot image, and for switching the image display unit 28 to be functioned as an electronic view finder.

A left button 305, a right button 306, an up button 307, and a down button 308 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification) as mentioned above.

A recording/playback selection switch 312 is used for switching a recording mode to a playback mode, or switching a playback mode to a recording mode. Note, in place of the above-described operation system, a dial switch may be adopted or other operation systems may be adopted.

<Operation in Single-Image Shooting>

Hereinafter, an operation of the digital camera 100 according to the present embodiment is described.

Figure 3:
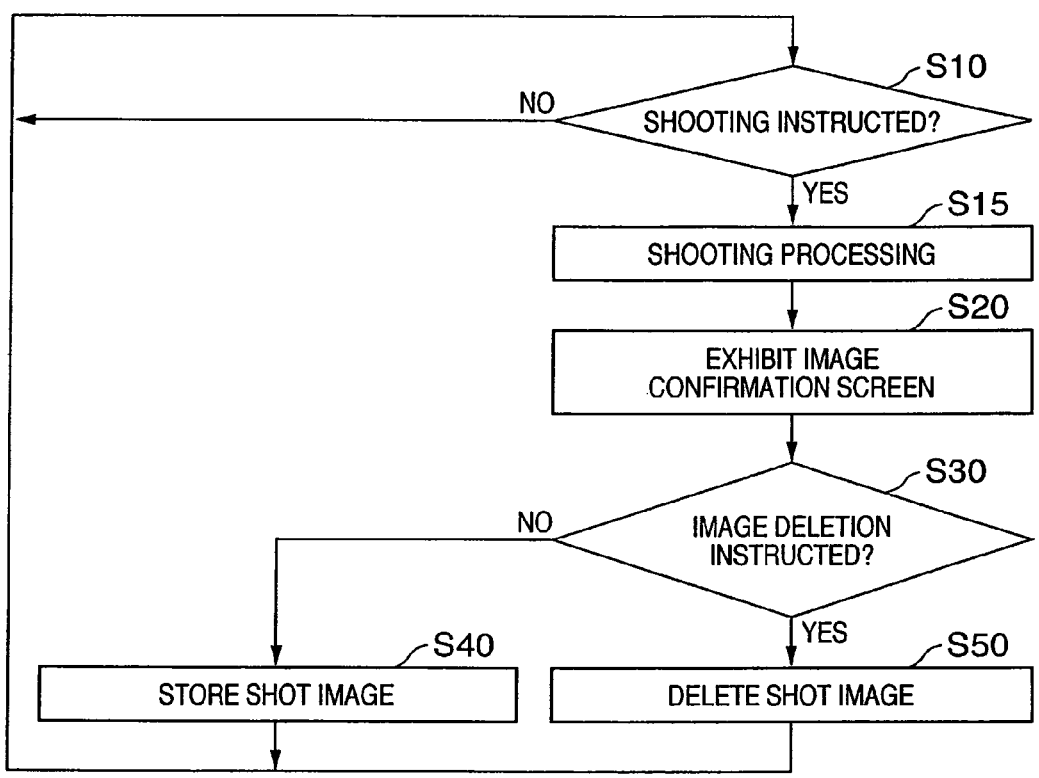
FIG. 3 is a flowchart describing a single-image shooting operation in the image sensing apparatus according to the embodiment of the present invention.

FIG. 3 is a flowchart describing the single-image shooting in which one image data file is generated and recorded in a single shooting instruction. This processing is stored as a program in the memory 52, and executed while the system controller 50 controls respective blocks as necessary.

The digital camera 100 according to the present embodiment comprises the function (quick review function) for immediately displaying a shot image on the image display unit 28 after shooting to confirm the shot result. Assume herein that the quick review function is normally activated.

In step S10, the system controller 50 waits for an input of a shooting start instruction through the operation unit 70. In this step, processing until the half-stroke of the shutter button 310 (turning ON the first shutter switch 62) is performed. When the shutter button 310 is pressed completely and the second shutter switch 64 is turned ON, the system controller 50 determines that a shooting start instruction is inputted. In step S15, shooting in accordance with various setting is performed. In this stage, shot image data may be stored in the memory 30 without being recorded in the recording medium 200 or 210, or may be recorded in the recording medium 200 or 210.

When generation of the shot image data is completed, display processing on the shot-image confirmation screen (quick review screen) is performed. Normally the quick review is displayed while the shutter button 310 is pressed, and also displayed for a predetermined period after the shutter button 310 is released. It may also be constructed so that pressing of a button, e.g., the button 303 which is normally used for determination, enables holding of the quick review displaying until a quick review cancellation which is described below is performed. The quick review cancellation may be realized by half-stroke of the shutter button 301 again, or may be realized by another member provided exclusively for cancellation. Further, when deletion is executed during quick review, the quick review ends as a matter of course. The memory controller 22 reads image data that has just been shot from the memory 30 or the recording medium 200 or 210, and writes the data in the image display memory 24. The image processing unit 50a of the system controller 50 writes graphical user interface image data in the image display memory 24 to allow a user to input instructions including image deletion and storage on the shot-image confirmation screen (quick review screen) (step S20).

FIG. 7 shows an example of the shot-image confirmation screen. This example shows an image 400 which has just been shot, a delete button 401 and a storage button 402 which are the graphical user interface for instructing deletion and storage.

In a case where a user instructs deletion of the image by, e.g., pressing the delete button 301, or by selecting the delete button 401 on the screen and pressing the enter button 303 (Yes in step S30), deletion processing is performed in step S50.

Meanwhile, in a case where deletion is not instructed but the quick review displaying is cancelled or image storage is instructed by the user (No in step S30), storage processing is performed in step S40. A storage instruction is given by selecting the storage button 402 on the screen and pressing the enter button 303.

In step S50, the system controller controls the memory controller 22 to delete the image data corresponding to the currently displayed image from the memory 30 or the recording medium 200 or 210.

Meanwhile, in step S40, the system controller 50 controls the memory controller 22 to read the image data corresponding to the currently displayed image from the memory 30 and record it in the recording medium 200 or 210. If the image data corresponding to the currently displayed image has already been recorded in the recording medium 200 or 210, no particular operation is performed.

As described above, in the present embodiment, there are several control methods as to which timing the image data is recorded as a file in the recording medium 200 or 210. For instance, immediately after the shooting operation in step S15, image data file recording in the recording medium may be started. If the image data file recording is in progress in step S30 at which deletion is selected, the recording operation is terminated; whereas if the recording operation is completed, the image data file is deleted actually from the recording medium. Alternatively, image data recording in the recording medium is not performed while the shot-image confirmation screen is displayed, but is started only when image deletion is not selected in step S30.

In any case, in a case where deletion is not instructed on the shot-image confirmation screen, the shot image is recorded. In a case where deletion is instructed, the processing method in the process is of no object as long as the shot image is not recorded.

<Operation in Plural-Image Shooting>

Figure 4:
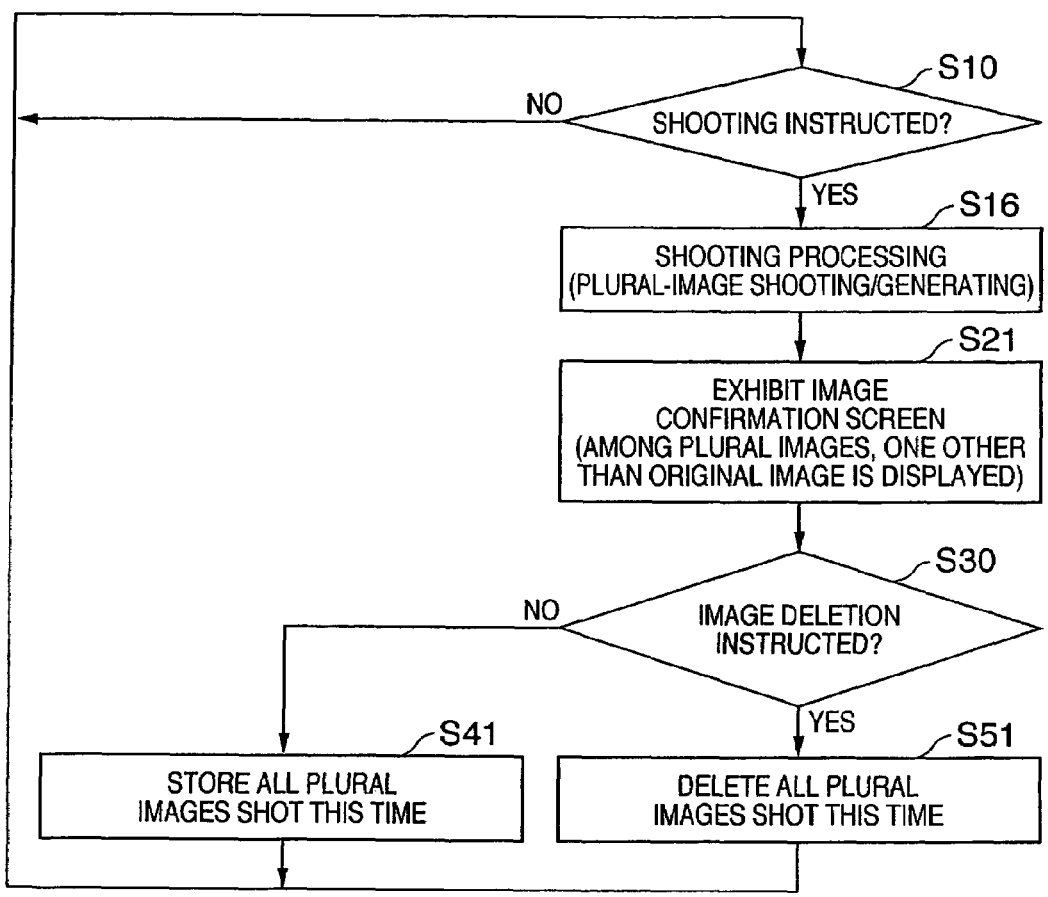
FIG. 4 is a flowchart describing a plural-image shooting operation in the image sensing apparatus according to the embodiment of the present invention.

Next, an operation in plural-image shooting of the digital camera 100 according to the present embodiment is described with reference to the flowchart in FIG. 4. As mentioned above, the digital camera 100 has a plural-image shooting function that can generate and record plural image data files in response to a single shooting instruction. For instance, prior to shooting an image, the camera allows a user to select the plural-image shooting mode or the aforementioned single-image shooting mode by the menu button 302 and the enter button 303. In accordance with the selection, the processing shown in the flowchart in FIG. 3 or the processing shown in the flowchart in FIG. 4 is executed. The processing in these flowcharts is stored in the memory 52 and executed by the system controller 50.

The function of plural image data file generation and recording can be realized by plural methods. For instance, the digital camera 100 automatically performs serial shooting (release the shutter plural times) in response to a single shooting instruction of a user (full stroke of the shutter), and plural image data files are generated and recorded. Alternatively, the digital camera 100 performs single shooting in response to a single shooting instruction of a user, and the image data obtained by the shooting (original image data) is subjected to some kind of image processing for generating and recording another image data. In this manner, single shooting can generate a group constructed with a series of plural image data files.

In the present embodiment, as long as plural image data files are generated and recorded as a result of single shooting operation by a user, the number of times and the timing the shutter of the digital camera 100 is released, and processing performed in the process are not limited.

In step S10, the system controller 50 waits for a shooting instruction as similar to the single-image shooting mode. When a shooting instruction is inputted, then in step S16, the system controller performs processing for plural-image shooting (shooting and image data generation) in accordance with a predetermined recording method.

The recording method includes the following:

(1) An image shot with normal shooting parameters and an image shot with different shooting parameters are recorded.

For instance, an auto bracket function corresponds to such recording. In an auto bracket function, shooting is performed with normal exposure (or white balance) and with corrected exposure of ±1 aperture value (or, with an increased/decreased color temperature of white balance by a predetermined value). Also, there is an auto-focus bracket function, where a focus point is shifted in stages while shooting is performed plural times.

(2) Images shot with common shooting parameters, but processed with a normal processing parameter and different processing parameters are recorded.

Such recording corresponds to recording original image data and another image data obtained by performing predetermined image processing on the original image data (e.g., color processing such as color conversion and color enhancement, or filtering such as edge enhancement). It also corresponds to recording original image data and another image data having different encoding methods and compression rates. Note that image data having different white balance can be obtained not only by changing shooting parameters, but also by changing parameters of image processing performed on the original image data.

In step S21, the system controller 50 displays an image confirmation screen as similar to the single-image shooting mode. Note in this embodiment, among the plural image data generated by shooting, image data other than the original image data is displayed on the image confirmation screen. For instance, in a case where the camera is set to record original image data as well as color-converted image data which has been obtained by converting red portions of the original image data to another color, the image displayed on the shot-image confirmation screen is the color-converted image data. In a case of auto bracket shooting, the image data displayed on the screen is one of the images shot with changed exposure and white balance. In a case where the camera generates plural non-original image data files (modified image data files), it is possible to set in advance which of the image data files is to be displayed on the shot-image confirmation screen.

In a case where bracket shooting and color conversion processing are set, the user is normally interested in the corrected or modified image data. For this reason, the present embodiment displays modified image data immediately after shooting. By virtue of this feature, the processing load can be reduced compared to the case of displaying plural generated image data, the time lag between shooting and image displaying can be shortened, and the image of the user's highest interest can be displayed, thus achieving a user-friendlier camera.

Note that, in a case where the up button 307, down button 308, left button 305, or right button 306 is pressed during image displaying on the shot-image confirmation screen, other modified image data may sequentially be displayed or, if a split screen or a multiple screen is available, plural image data may simultaneously be displayed. The original image data may be included in the sequential displaying or, if a split screen or a multiple screen is available, plural simultaneous displaying.

In a case where deletion is instructed on the shot-image confirmation screen as mentioned above, the system controller 50 performs deletion in step S51. Herein, plural image data files generated by the plural-image shooting function are all deleted. There are various methods for specifying plural image files to be deleted, and any methods can be used. For instance, if the number (n) of generated files of modified image data is known, n+1 image data files inclusive of the original image data are deleted in order of newest data. Alternatively, group identification data indicative of generation in the same shooting operation may be recorded in the header at the time of image data file generation, and image data files having the same group identification data may be searched and deleted. If plural groups constructed with plural data files are displayed, the user selects an image to be deleted by moving a cursor or highlight using the up, down, left, and right buttons 305 to 308. By this operation, image data files that constitute the group including the selected image are all deleted.

As set forth above, according to the present embodiment, the camera displays modified image data of the user's highest interest on the shot-image confirmation screen which is displayed immediately after shooting. When deletion is instructed on the shot-image confirmation screen, the camera regards that the user highly likely considers the shooting as failure, and deletes all the plural image data generated in the same shooting.

On the contrary, in a case where deletion is not instructed but quick review displaying is cancelled, or image storing is instructed by the user (No in step S30), storage processing is performed in step S41. Image storage instruction can be given by, for instance, pressing the enter button 303 while the storage button 402 is selected on the screen.

In step S41, the system controller 50 controls the memory controller 22 to read plural image data, including the currently displayed image, from the memory 30 and record them in the recording medium 200 or 210. If the plural image data generated in the plural-image shooting mode have already been recorded in the recording medium 200 or 210, no particular operation is performed.

Figure 5:
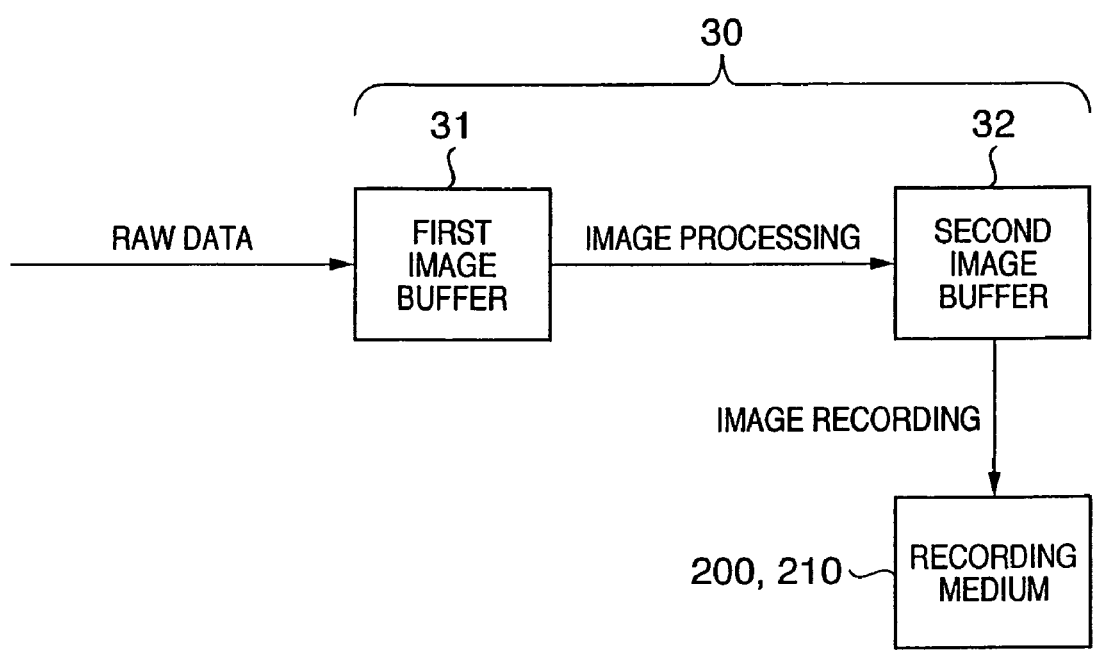
FIG. 5 is an explanatory diagram on image data writing by the image sensing apparatus according to the embodiment of the present invention.

FIG. 5 is an explanatory diagram on recording both the original image data and the modified image data which has been subjected to image processing in the digital camera 100 according to the present embodiment.

The first and second image buffers 31 and 32 are realized by employing, for instance, different areas of the memory 30. Generally in an image sensing apparatus utilizing an image sensing device, RAW data is temporarily stored in the first image buffer 31, then developing such as adjustment of white balance and colors is performed in accordance with respective setting of the image sensing apparatus. Thereafter the data is converted to image data in a predetermined compression format, e.g., JPEG, then developed in the second image buffer 32, and recorded in the recording medium 200 or 210.

As described above, recording image data in the recording medium 200 or 210 is performed through the second image buffer 32. Therefore, in a case of recording both the modified image data which has been subjected to color conversion and white balance correction and the original image data which has not been subjected to any modification processing, first the modified image data is recorded, thereafter the original image data is developed in the second image buffer and recorded in the recording medium 200 or 210.

In other words, data captured by a shooting operation of the image sensing device 14 is temporarily stored as RAW data in the first image buffer 31, and modified image data obtained by performing various image modification processing and data compression processing on the RAW data in accordance with the setting is developed in the second image buffer 32. Then, the image data developed in the second image buffer 32 is recorded in the recording medium 200 or 210. When recording of the modified image data is completed, unmodified original image data (which has been subjected to regular developing) is developed in the second image buffer 32 in a predetermined format based on the RAW data stored in the first image buffer 31, and recorded in the recording medium 200 or 210.

Each time shooting is performed, the digital camera 100 internally performs the above-described processing plural times, thereby recording plural images. However, as mentioned above, it is important herein that a delete instruction on the shot-image confirmation screen decides deletion of all the plural images or recording of images in the recording medium. Detailed processing within the process, such as the methods of realizing image recording, abandoning the recording, deletion, cancellation of deletion and so forth, may be realized by any methods. The above description has been provided on a case of recording plural image data sequentially in the recording medium independent of instructions on the shot-image confirmation screen. However, plural image buffers equivalent to the second image buffer may be provided. Image data files which are recordable in the recording medium 200 or 210 may be stored in the memory 30, and recording of the image data in the recording medium 200 or 210 may be started when no delete instruction is given on the shot-image confirmation screen.

<Operation in Playback Mode>

The digital camera 100 according to the present embodiment handles plural image data, generated in the plural-image shooting mode, collectively with regard to deletion processing on the shot-image confirmation screen. Once storage in the recording medium is decided, the data is handled as individual image data without discrimination of original image data or modified image data, as similar to conventional data handling.

Figure 6:
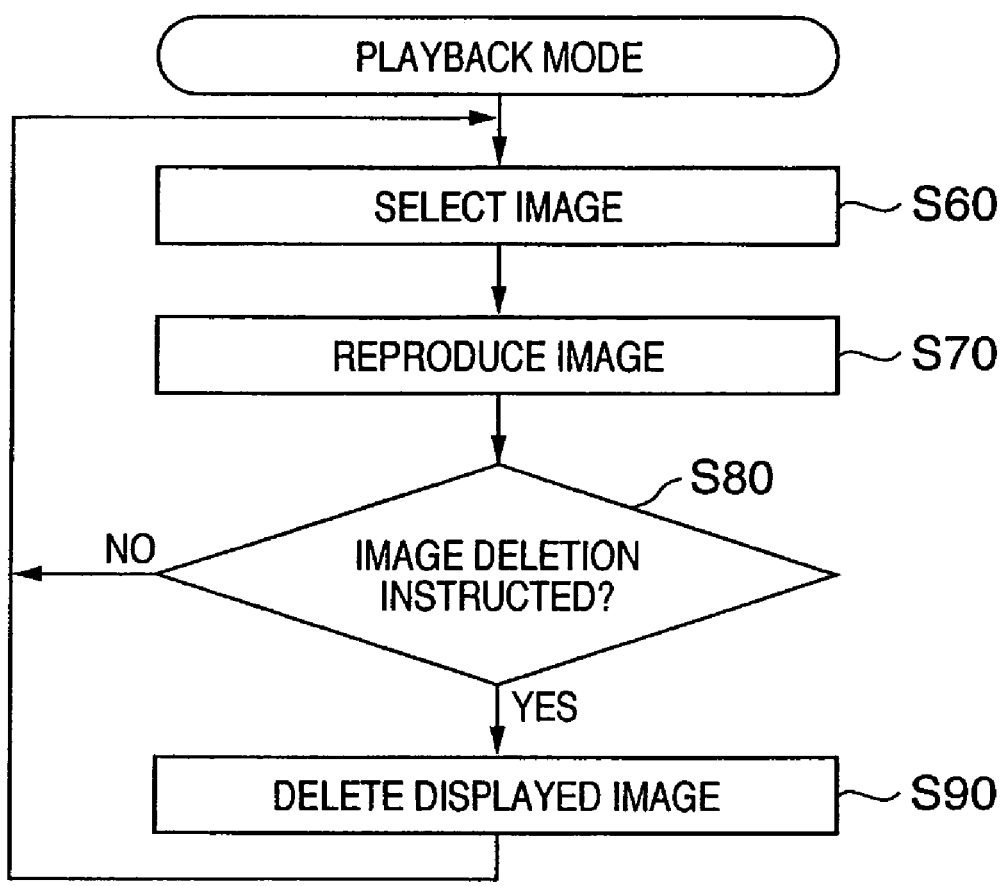
FIG. 6 is a flowchart describing an operation in a playback mode of the image sensing apparatus according to the embodiment of the present invention.

FIG. 6 is a flowchart describing an operation in a playback mode of the digital camera 100 according to the present embodiment. The processing in the flowchart is stored in the memory 52 and executed by the system controller 50.

In step S60, the system controller 50 reads thumbnail data of images recorded in, e.g., the recording medium 200, and displays a list of images on the image display unit 28. A user employs the up, down, left, and right buttons 305 to 308 as well as enter button 303 to select an image to be displayed from the thumbnails in the list. In accordance with the instruction, the system controller 50 reads image data corresponding to the selected thumbnail data from the recording medium 200, and displays the image on the entire screen of the image display unit 28 (step S70).

In this state, if the delete button 301 is pressed, the system controller 50 displays a delete confirmation screen. When deletion is confirmed, the image data file corresponding to the displayed image data is deleted from the recording medium 200 (step S80).

As described above, in a case where deletion is instructed during image viewing in the playback mode, only the displayed image is deleted as similar to a conventional image sensing apparatus.

As has been set forth above, the present embodiment provides an image sensing apparatus comprising a plural-image shooting function which can generate and record plural image data in response to a single shooting instruction. In a case where deletion is instructed on the shot-image confirmation screen which displays images shot by this function immediately after shooting, plural image data obtained by the same shooting operation are all deleted. By virtue of this feature, in a case where a user fails in image shooting in the plural-image shooting mode or wishes to cancel the shot images immediately after the shooting, the user can be saved from the conventional cumbersome operation, that is, switching to a playback mode and repeating delete processing for each image, thus usability can be improved.

Furthermore, on the shot-image confirmation screen which displays images immediately after shooting in the plural-image shooting mode, because modified image data is displayed instead of original image data, the user can quickly determine right or wrong of shooting, and necessity or non-necessity of image storing. Furthermore, since the displayed image is only one, the time lag between shooting and displaying of the shot-image confirmation screen can be reduced.

OTHER EMBODIMENT

Although the aforementioned embodiment has not particularly described an image format recorded in the recording medium, the original image data and modified image data may be recorded in a JPEG format, or RAW data may be recorded in place of original image data.

In this case, RAW data, parameters for development processing (development parameters) with no modification, and modification development parameters for performing development processing including modification such as white balance alteration, may be recorded.

Modified or unmodified JPEG image data is incorporated, as developed image data, in the header of RAW data. Therefore, modified image data and unmodified image data can be managed in association with each other. However, as long as shooting parameters and developed image data are managed in association with each other, they may be managed by other methods.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-015846 filed Jan. 24, 2005, which is hereby incorporated by reference herein in its entirety.

What is claimed is:

1. An image sensing apparatus having a single-image shooting mode for generating single image data in response to a single shooting instruction, and a plural-image shooting mode for generating plural image data in response to a single shooting instruction, comprising:
    a display control unit adapted to display shot image data immediately after shooting;
    a detection unit adapted to detect existence or absence of a delete instruction during displaying of the shot image data; and
    a deletion unit adapted to delete, upon detection of a delete instruction, only the shot image data being displayed if the shot image data being displayed is generated by shooting in the single-image shooting mode, and deletes the shot image data being displayed as well as other image data generated by shooting in the plural-image shooting mode if the shot image data being displayed is generated by shooting in the plural-image shooting mode,
    wherein:
    said display control unit displays immediately after shooting only one image data among a plurality of shot image data generated by shooting in the plural-image shooting mode,
    the plurality of image data generated by shooting in the plural-image shooting mode includes normal image data which has been shot with a normal shooting parameter and generated by performing normal image processing, and modified image data which has been generated by changing at least the shooting parameter or an image processing content from that of the normal image data, and the image data displayed immediately after shooting is the modified image data.

2. The image sensing apparatus according to claim 1, wherein the shooting parameter is an exposure parameter, focus, or white balance.

3. The image sensing apparatus according to claim 1, wherein the image processing is alt least one of encoding, color processing, and filtering.

4. The image sensing apparatus according to claim 1, wherein the shooting parameter is an exposure parameter or focus.

5. The image sensing apparatus according to claim 1, wherein the image processing is at least one of encoding, color processing, filtering and white balance.

6. The image sensing apparatus according to claim 1, wherein said shooting instruction is pressing of a shutter button, and when a shutter button pressing state is maintained continuously from the shooting instruction, said display control unit continues the displaying of the shot image data immediately after shooting.

7. The image sensing apparatus according to claim 1, wherein in a playback mode for viewing shot image data recorded in a recording medium, in a case where a delete instruction is given to one of the plurality of shot image data generated by shooting in the plural-image shooting mode, said deletion unit deletes only the one shot image data that has been instructed for deletion.

8. A control method of an image sensing apparatus having a single-image shooting mode for generating single image data in response to a single shooting instruction, and a plural-image shooting mode for generating plural image data in response to a single shooting instruction, comprising:
- a display step of displaying shot image data immediately after shooting;
- a detection step of detecting existence or absence of a delete instruction during displaying of the shot image data; and
- a deletion step of deleting, upon detection of a delete instruction, only the shot image data being displayed if the shot image data being displayed is generated by shooting in the single-image shooting mode, and deleting the shot image data being displayed as well as other image data generated by shooting in the plural-image shooting mode if the shot image data being displayed is generated by shooting in the plural-image shooting mode, wherein:
- said display step displays immediately after shooting only one image data among a plurality of shot image data generated by shooting in the plural-image shooting mode,
- the plurality of image data generated by shooting in the plural-image shooting mode includes normal image data which has been shot with a normal shooting parameter and generated by performing normal image processing, and modified image data which has been generated by changing at least the shooting parameter or an image processing content from that the normal image data, and
- the image data displayed immediately after shooting is the modified image data.

9. An image sensing apparatus having a single-image shooting mode for generating single image data in response to a single shooting instruction, and a plural-image shooting mode for generating plural image data in response to a single shooting instruction, comprising:
- a display control unit adapted to display shot image data immediately after shooting;
- a detection unit adapted to detect existence or absence of a delete instruction during displaying of the shot image data; and
- a deletion unit adapted to delete, upon detection of a delete instruction, only the shot image data being displayed if the shot image data being displayed is generated by shooting in the single-image shooting mode, and deletes the shot image data being displayed as well as other image data generated by shooting in the plural-image shooting mode if the shot image data being displayed is generated by shooting in the plural-image shooting mode,
- wherein said shooting instructions is pressing of a shutter button, and when a shutter button pressing state is maintained continuously from the shooting instruction, said display control unit continues the displaying of the shot image data immediately after shooting.

* * * * *